United States Patent [19]

Clarke et al.

[11] Patent Number: 4,517,107

[45] Date of Patent: May 14, 1985

[54] DETERGENT BAR

[75] Inventors: Terence A. Clarke; Richard B. Edwards; Graeme N. Irving, all of Wirral, England

[73] Assignee: Lever Brothers Company, New York, N.Y.

[21] Appl. No.: 587,876

[22] Filed: Mar. 14, 1984

Related U.S. Application Data

[63] Continuation of Ser. No. 479,630, Mar. 28, 1983, abandoned.

[30] Foreign Application Priority Data

| | | | |
|---|---|---|---|
| Mar. 29, 1982 | [GB] | United Kingdom | 8209148 |
| Jan. 24, 1983 | [GB] | United Kingdom | 8301905 |

[51] Int. Cl.[3] ..... B01F 7/02; B29B 1/06; C11D 13/10; C11D 17/00

[52] U.S. Cl. ..... 252/108; 252/122; 252/134; 252/368; 252/370; 252/371; 252/DIG. 16; 264/176 R; 264/310; 264/312; 264/349; 366/99; 366/279; 366/307; 425/200; 425/204; 425/207; 425/209

[58] Field of Search ..... 252/122, 108, 134, 368, 252/370, 371, DIG. 16; 264/176 R, 310, 312; 366/99, 279, 307; 425/200, 202, 204, 207, 208, 209

[56] References Cited

U.S. PATENT DOCUMENTS

| | | | |
|---|---|---|---|
| 2,295,594 | 9/1942 | Mills | 252/368 |
| 2,640,033 | 5/1953 | Marshall | 252/367 |
| 2,686,761 | 8/1954 | Ferguson et al. | 252/109 |
| 2,810,159 | 10/1957 | Teichmann | 18/12 |
| 2,813,302 | 11/1957 | Beck | 18/12 |
| 2,970,116 | 1/1961 | Kelly | 252/368 |
| 3,089,197 | 5/1963 | Chaffee | 425/207 |
| 3,174,185 | 3/1965 | Gerber | 366/99 |
| 3,523,909 | 8/1970 | Bradley | 252/270 |
| 3,779,521 | 12/1973 | Godines | 366/79 |
| 3,801,248 | 4/1974 | Fischer | 425/199 |
| 4,057,379 | 11/1977 | Sato | 425/199 |
| 4,253,771 | 3/1981 | Renk | 366/89 |
| 4,419,014 | 12/1983 | Gale | 366/99 |

FOREIGN PATENT DOCUMENTS

| | | |
|---|---|---|
| 81304235.5 | 5/1981 | European Pat. Off. . |
| 834242 | 3/1952 | Fed. Rep. of Germany . |
| 2543 | 5/1956 | Fed. Rep. of Germany . |
| 1090183 | 10/1960 | Fed. Rep. of Germany . |
| 2050222 | 5/1971 | Fed. Rep. of Germany . |
| 2151891 | 4/1973 | Fed. Rep. of Germany . |
| 1135463 | 4/1957 | France . |
| 723361 | 2/1955 | United Kingdom . |
| 727646 | 4/1955 | United Kingdom . |
| 729833 | 5/1955 | United Kingdom . |
| 787764 | 12/1957 | United Kingdom . |
| 841743 | 7/1960 | United Kingdom . |
| 843849 | 8/1960 | United Kingdom . |
| 930339 | 7/1963 | United Kingdom . |
| 935200 | 8/1963 | United Kingdom . |
| 1281628 | 7/1972 | United Kingdom . |
| 1327511 | 8/1973 | United Kingdom . |
| 1447435 | 8/1976 | United Kingdom . |
| 1475216 | 6/1977 | United Kingdom . |
| 2034742 | 6/1980 | United Kingdom . |
| 2106407 | 4/1983 | United Kingdom . |

OTHER PUBLICATIONS

Kirk–Othmer Encyclopedia of Chemical Technology, Second Edition, vol. 18, pp. 426–432.

Buerger et al. in Proc. N.A.S., 31(1945), pp. 226–233.

Ferguson, R. H., "Oil & Soap", Jan. 1944, pp. 6 to 9.

Ferguson, R. H. et al., "Industrial and Engineering Chemistry", 35, No. 9, (1943), pp. 1005–1012.

Bailey's Industrial Oil & Fat Products, vol. 1, 4th Ed., John Wiley & Sons, pp. 523–526.

RAPRA CTM cavity transfer mixer advertising leaflet.

RAPRA News, vol. 5, No. 3, p. 5.

RAPRA News, vol. 6, No. 1, p. 1 and p. 5.

Applications of the Cavity Transfer Mixer to Rubber Extrusion, presentation at a meeting of the Rubber Div., Amer. Chemical Soc., Philadelphia, May 4–8, 1982 by R. S. Hindmarch & G. M. Gale.

Press Release by "The International Technical Centre for Rubbers and Plastics", dated Aug. 3, 1981 and Jan. 6, 1982, Addendum to such Press Release showing the persons to whom such Press Release was dispatched upon a worldwide basis.

Elastomerics, Oct. 1981, p. 76/8.

Plastics & Rubber Weekly, No. 919, Jan. 9, 1981, p. 1.

*Primary Examiner*—Dennis L. Albrecht

*Attorney, Agent, or Firm*—James J. Farrell

[57] ABSTRACT

A soap-containing formulation capable of becoming transparent on working is subjected to shear between two mutually displaceable surfaces. A shear zone is formed in the formulation as the latter is entrained in the surfaces.

5 Claims, 8 Drawing Figures

DETERGENT BAR

This is a continuation application of Ser. No. 479,630, filed Mar. 28, 1983, now abandoned.

FIELD OF THE INVENTION

This invention relates to the processing of soap feedstocks to provide a soap bar having transparent properties.

BACKGROUND TO THE INVENTION

The presence of certain soap phases in a soap bar will provide the bar with transparent properties. The literature in the field of soap technology describes how soap bars can be provided with a transparent property by suitable selection of processing conditions and/or components. While quantitative measurements of transparency using methods are described in the literature, for example, visual print size, voltage and graded lines, there is a general acceptance of the term transparent to describe a class of soap bars. The present invention utilises processing conditions to achieve transparency by subjecting the soap feedstock to considerable working within a specific temperature range in an efficient manner; the temperature range being sensitive to the composition.

An example of a process utilising working to achieve transparency will be found in U.S. Pat. No. 2,970,116 (Kelly).

GENERAL DESCRIPTION

The formulations which can be utilised in forming transparent soap bars have been well characterised in the literature. They will generally contain components to assist in the processing or provision of the desired properties for example potassium soaps, glycerol, sorbitol and castor derived soaps.

The present invention uses a device of the cavity transfer mixer class to work the soap base. These devices comprise two closely spaced mutually displaceable surfaces each having a pattern of cavities which overlap during movement of surfaces so that material moved between the surfaces traces a path through cavities alternately in each surface so that the bulk of the material passes through the shear zone in the material generated by displacement of the surfaces. The temperature of processing is preferably in the range from about 30° C. to about 55° C., and more preferably from 40° C. to 50° C.

Cavity transfer mixers are normally prepared with a cylindrical geometry and in the preferred devices for this process the cavities are arranged to give constantly available but changing path ways through the device during mutual movement of the two surfaces. The devices having a cylindrical geometry may comprise a stator within which is journalled a rotor; the opposing faces of the stator and rotor carry the cavities through which the material passes during its passage through the device.

The device may also have a planar geometry in which opposed plane surfaces having patterns of cavities would be moved mutually, for example by rotation of one plane, so that material introduced between the surfaces at the point of rotation would move outwards and travel alternately between cavities on each surface.

Another form of cylindrical geometry maintains the inner cylinder stationary while rotating the outer cylinder. The central stator is more easily cooled, or heated if required, because the fluid connections can be made in a simple manner; the external rotor can also be cooled or heated in a simple manner. It is also mechanically simpler to apply rotational energy to the external body rather than the internal cylinder. Thus this configuration has advantages in construction and use.

Material is forced through the mixer using auxilliary equipment as the rotor is turned. Examples of the auxilliary equipment are screw extruders and piston rams. The auxiliary equipment is preferably operated separately from the mixer so that the throughput and work performed on it can be separately varied. The separate operation may be achieved by arranging the auxiliary equipment to provide material for processing at an angle to the centre line of the shear-producing device. This arrangement allows rotational energy to be supplied to the device producing shear around its centre line. An in-line arrangement is more easily achieved when the external member of the device is the rotor. Separate operation of the device and auxiliary equipment assists in providing control of the processing.

In general a variety of cavity shapes can be used, for example Metal Box (UK No. 930 339) disclose longitudinal slots in the two surfaces. The stator and rotor may carry slots, for example six to twelve, spaced around their periphery and extending along their whole length.

Preferably one or both surfaces are subjected to thermal control. The process allows efficient heating/cooling of the materials to be achieved.

The soap feedstock may contain non-soap detergents in amounts which would not interfere with the desired effect. Examples of these actives are alkane sulphonates, alcohol sulphates, alkyl benzene sulphonates, alkyl sulphates, acyl isethionates, olefin sulphonates and ethoxylated alcohols.

The processed feedstock was made into bar form using standard stamping machinery. Other product forms, e.g. extruded particles (noodles) and beads can be prepared from the feedstock.

BRIEF DESCRIPTION OF THE DRAWINGS

The invention will be described with reference to the accompanying diagrammatic drawings in which.

SPECIFIC DESCRIPTION OF DEVICES

Embodiments of the devices will now be described.

Figure 1:
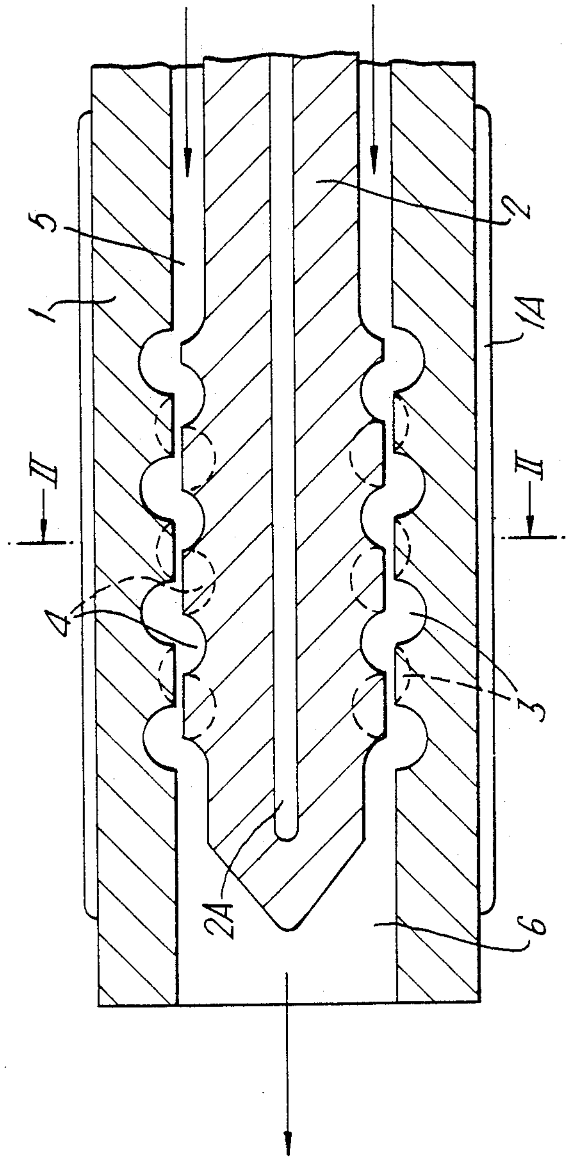
FIG. 1 is a longitudinal section of a cavity transfer mixer with cylindrical geometry.

A cavity transfer mixer is shown in FIG. 1 in longitudinal section. This comprises a hollow cylindrical stator member 1, a cylindrical rotor member 2 journalled for rotation within the stator with a sliding fit, the facing cylindrical surfaces of the rotor and stator carrying respective pluralities of parallel, circumferentially extending rows of cavities which are disposed with:

(a) the cavities in adjacent rows on the stator circumferentially offset;

(b) the cavities in adjacent rows on the rotor circumferentially offset; and (c) the rows of cavities on the stator and rotor axially offset.

Figure 2:
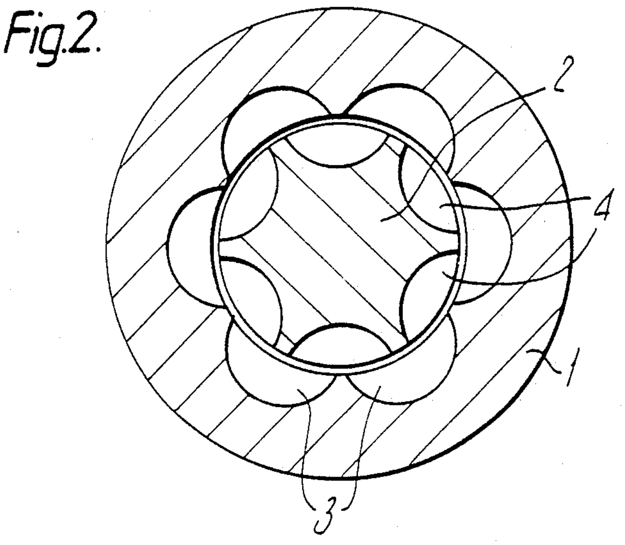
FIG. 2 is a transverse section along the line II—II on FIG. 1.
Figure 3:
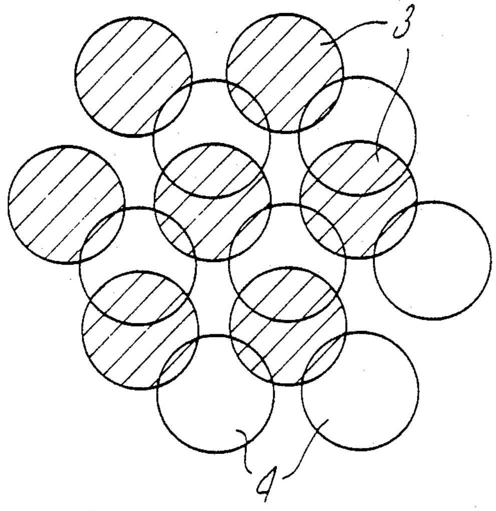
FIG. 3 illustrates the pattern of cavities in the device of FIG. 1.

The pattern of cavities carried on the stator 3 and rotor 4 are illustrated on FIG. 3. The cavities 3 on the stator are shown hatched. The overlap between patterns of cavities 3, 4 is also shown in FIG. 2. A liquid jacket 1A is provided for the application of temperature control by the passage of heating or cooling water. A temperature control conduit 2A is provided in the rotor.

The material passing through the device moves through the cavities alternately on the opposing faces of the stator and rotor. The cavities immediately behind those shown in section are indicated by dotted profiles on FIG. 1 to allow the repeating pattern to be seen.

The material flow is divided between pairs of adjacent cavities on the same rotor or stator face because of the overlapping position of the cavity on the opposite stator or rotor face.

The whole or bulk of the material flow is subjected to considerable working during its passage through the shear zone generated by the mutual displacement of the stator and rotor surfaces. The material is entrained for a short period in each cavity during passage and thus one of its velocity components is altered.

The mixer had a rotor radius of 2.54 cm with 36 hemispherical cavities (radius 0.9 cm) arranged in six rows of six cavities. The internal surface of the stator carried seven rows of six cavities to provide cavity overlap at the entry and exit. The material to be worked was injected into the device through channel 5, which communicates with the annular space between the rotor and stator, during operation by a screw extruder. The material left the device through nozzle 6.

Figure 4:
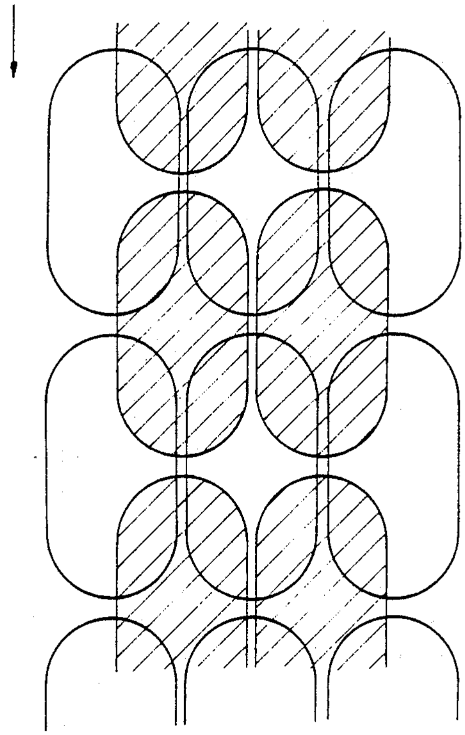
FIGS. 4, 5 and 7 illustrate other patterns of cavities.

FIG. 4 shows elongate cavities arranged in a square pattern; these cavities have the sectional profile of FIG. 2. These cavities are aligned with their longitudinal axis parallel to the longitudinal axis of the device and the direction of movement of material through the device; the latter is indicated by the arrow.

Figure 5:
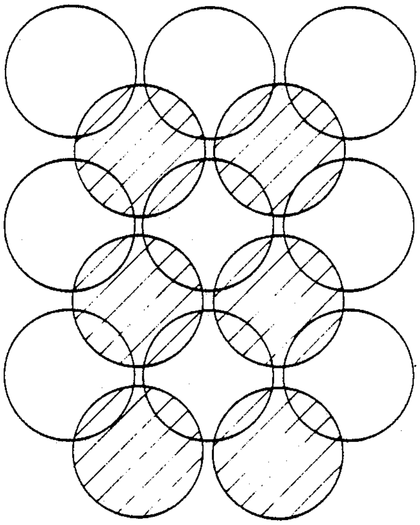

FIG. 5 shows a pattern of cavities having the dimensions and profile of those shown in FIGS. 1, 2 and 3. The cavities of FIG. 5 are arranged in a square pattern with each cavity being closely spaced from flow adjacent cavities on the same surface. This pattern does not provide as high a degree of overlap as given by the pattern of FIG. 3. The latter has each cavity closely spaced to six cavities on the same surface, i.e. a hexagonal pattern.

Figure 6:
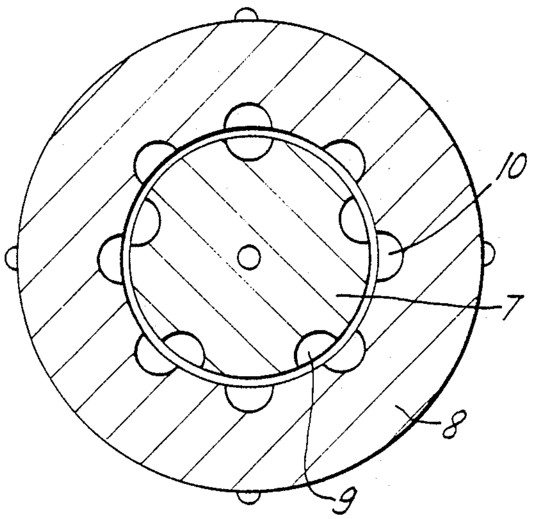
FIG. 6 is a transverse section through a mixer having grooves in the opposed surfaces of the device.

FIG. 6 is a section of a cavity transfer mixer having a rotor 7 rotatably positioned within the hollow stator 8 having an effective length of 10.7 cm and a diameter of 2.54 cm. The rotor carried five parallel grooves 9 of semi-circular cross section (diameter 5 mm) equally spaced around the periphery and extending parallel to the longitudinal axis along the length of the rotor. The inner cylindrical surface of the stator 8 carried eight grooves 10 of similar dimensions extending along its length and parallel to the longitudinal axis. This embodiment, utilised cavities extending along the length of the stator and rotor without interruption. Temperature control jacket and conduit were present.

Figure 7:
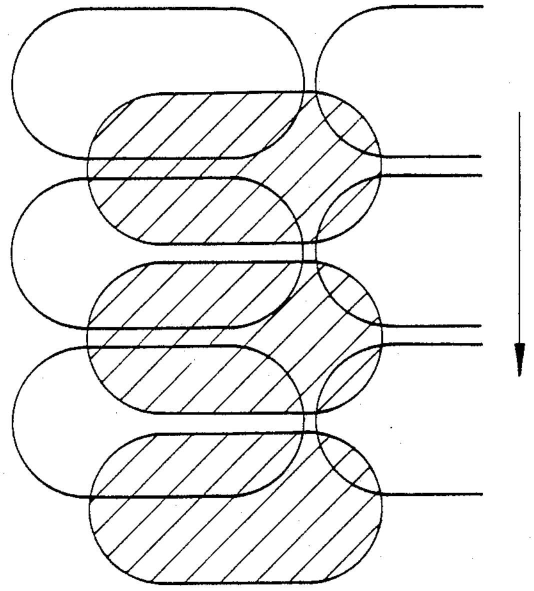

FIG. 7 shows a pattern of cavities wherein the cavities on the rotor, shown hatched, and stator have a larger dimension normal to the material flow; the latter is indicated by an arrow. The cavities are thus elongate. This embodiment provides a lower pressure drop over its length compared with devices of similar geometry but not having cavities positioned with a longer dimension normal, i.e. perpendicular to the material flow. To obtain a reduction in pressure drop at least one of the surfaces must carry elongate cavities having their longer dimension normal to the material flow.

Figure 8:
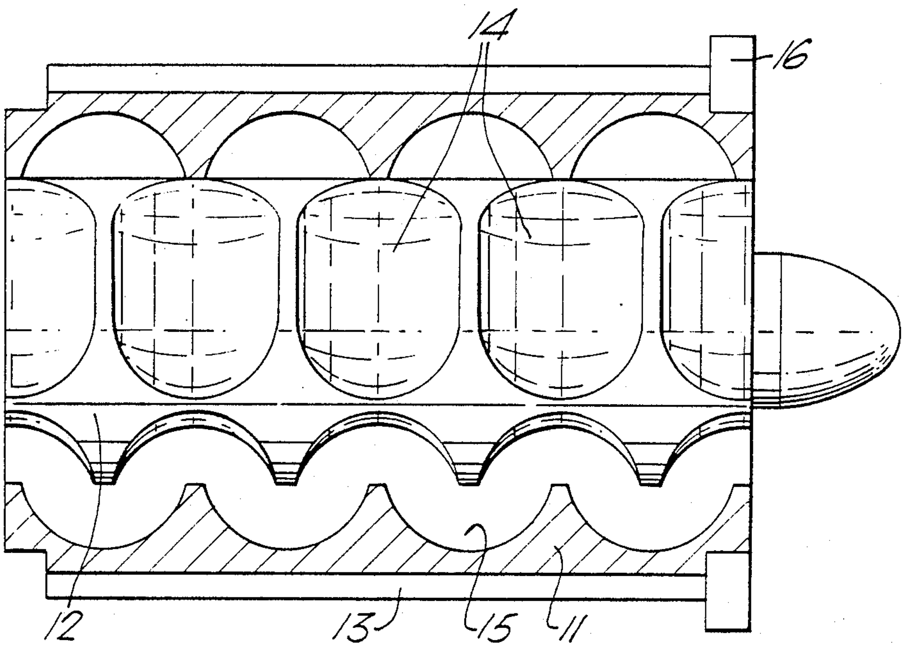
FIG. 8 is a longitudinal section of a cavity transfer mixer in which the external cylinder forms the rotor.

The cavity transfer mixer of FIG. 8 had the external cylinder 11 journalled for rotation about central shaft 12. Temperature control jacket 13 and conduit were present but the latter is now shown because the cavities on the central shaft are shown in plan view while the rotor is sectioned. The central stator (diameter 52 mm) had three rows 14 of three cavities with partial, i.e. half cavities at the entry and exit points. On the rotor there were four rows 15 of three cavities. The cavities on the stator and rotor were elongate with a total arc dimension of 5.1 cm normal to the material flow with hemispherical section ends of 1.2 cm radius joined by a semicircular sectioned panel of the same radius. The cavities were arranged in the pattern of FIG. 7, i.e. with their long dimension normal to material flow. The rotor was driven by a chain drive to external toothed wheel 16.

EXAMPLES

Examples of the process of the invention.

EXAMPLE I

A cavity transfer mixer illustrated in FIG. 1 was used. The mixer had a rotor radius of 2.54 cm with 36 hemispherical cavities (radius 0.9 cm) arranged in six rows of six cavities. The internal surface of the stator carried seven rows of six cavities to provide cavity overlap at the entry and exit. The material to be worked was injected into the device through channel 5, which communicates with the annular space between the rotor and stator, during operation by a screw extruder. The material left the device through nozzle 6.

The fats, oils and rosin were added to the nigre of the previous boil to give the required blend (74 tallow/26 coconut). The mix was then saponified using NaOH/KOH and fitted so that neat soap separated on top of the nigre and a small amount of lye. The neat soap layer was removed and additional glycerol added together with additional electrolyte. The soap was vacuum dried to a composition of Sodium soaps: 61%
Potassium soaps: 11%
Rosin: 4%
Glycerol: 6%
Electrolyte: 0.8%
Water: 17%

As prepared this formulation leads to opaque soap chips.

The opaque soap chips at 43° C. were passed into the cavity transfer mixer by use of a soap plodder at 516 g $min^{-1}$ and left the mixer at 49° C. The mixer was operated at 120 revolutions per minute. The extruded billet had a commercially acceptable transparency equivalent to that obtained by energetically working in a sigma blade mixer for 60 minutes in the temperature range 40° C. to 48° C.

Transparency was measured using the method described in U.S. Pat. No. 3,274,119 (5 mm thick sample) the feedstock gave a reading of 2.5% and the product 67%. Similar results were achieved using a cavity radius of 1.2 cm.

EXAMPLE II

In this Example a degree of transparency is provided in a soap base by utilising a cavity transfer mixer having longitudinal grooves on the opposed surfaces of a rotor/stator combination with cylindrical geometry. The rotor was rotatably positioned within the hollow stator and had an effective length of 10.7 cm and a diameter of 2.54 cm. It carried five parallel grooves of semi-circular cross section (diameter 5 mm) equally spaced around the periphery and extending parallel to the longitudinal axis along the length of the rotor. The inner cylindrical surface of the stator carried eight grooves of similar dimensions extending along its length and parallel to the longitudinal axis. This embodiment, shown in section in FIG. 6, utilised cavities extending along the length of the stator and rotor without interruption.

The soap base used in Example I was passed through the device from a soap plodder at a rate of 28 $g/min^{-1}$. The base material is moved through the device transferring alternately between the grooves in the rotor and the stator and thereby travelling through the shear layer in the material in the narrow gap with nominal sliding fit between the opposed surfaces. The temperature at extrusion was about 45° C. and the rotor was driven at 100 revolutions per minute by suitable gearing from the plodder.

The transparency was measured using the method of Example I, the feedstock base gave a reading of 2.5% and the product 11.5%. Although this transparency is unlikely to be sufficient for a commercial product it indicates a device with the geometry described produces a degree of transparency in a suitable feedstock.

EXAMPLE III

The formulation described in Example I was passed through a device having the general features of construction of that described in FIG. 1. The cavities had a hemi-spherical section with a radius of 1.2 cm and were arranged on the external stator in eight rows of six cavities arranged circumferentially. The centrally positioned rotor (diameter 52 mms) had seven rows of six cavities with partial (i.e. half) cavities at the entry and exit points.

The rotor was rotated at 125 revolutions per minute and a throughput of 490 g per minute was provided by a soap plodder. The temperature of the soap was 20° C. at entry and 51° C. at exit. Water cooling was applied to the stator and rotor components.

The material extruded from the device had a transmission of 69%.

EXAMPLE IV

Example III was repeated with cavities having a radius of 0.7 cm. The stator carried 12 rows of cavities with 10 cavities arranged circumferentially. The rotor had 11 rows of 10 cavities arranged in a circle with half cavities at each end. The stator and rotor were subjected to water cooling. The rotor had 11 rows of 10 cavities arranged in a circle with half cavities at each end. The stator and rotor were subjected to water cooling. The rotor was turned at 75 revolutions $min^{-1}$ and a throughput of 170 g $min^{-1}$ was provided from a soap plodder. The input and output temperatures were 32° C. and 46° C. and the transmission of the final product was 69%.

EXAMPLE V

Example III was repeated using an array of cavities as illustrated in FIG. V, that is with a cubic array. The cavities had a hemispherical section with a radius of 1.2 cm and were arranged on the external stator in six rows of six cavities arranged circumferentially. The centrally positioned rotor (diameter 52 mm) had five rows of six cavities with partial, i.e. half, cavities at the entry and exit points.

The rotor was rotated at 150 rpm with a throughput of 450 g/minute provided by a soap plodder. Water cooling was applied to the stator and rotor components; the temperature of the soap was 25° C. at entry and 48° C. at exit.

The material extruded from the device was found to have a transmission of 69%.

EXAMPLE VI

Example III was repeated using the cavity array shown in FIG. 7. The cavities were elongate with a total arc dimension of 5.1 cm normal to the material flow formed with hemispherical section ends of 1.2 cm radius joined by a semicircular sectioned panel of the same radius. The cavities were arranged on the external stator in six rows of three cavities arranged circumferentially. The central rotor (diameter 52 mm) had five rows of three cavities with partial, i.e. half, cavities at the entry and exit points.

The rotor was rotated at 176 rpm with a throughput of 460 g/minute provided by a soap plodder. Water cooling was applied to the stator and rotor components; the temperature of the soap was 25° C. at entry and 47° C. at exit.

The material extruded from the device had a transmission of 67%.

EXAMPLE VII

Example III was repeated using the cavity array shown in FIG. 4. The cavities were elongate with a total dimension of 8.4 cm parallel to the material flow and formed with hemispherical section ends of 1.2 cm radius joined by a semicircular sectioned channel of the same radius. The cavities were arranged on the external stator in three rows of six cavities arranged circumferentially. The centrally positioned rotor (diameter 52 mm) had two rows of six cavities with partial cavities at the entry and exit points.

The rotor was rotated at 176 rpm and a throughput of 425 g/minute was provided by a soap plodder. Water cooling was applied to stator and rotor components; the temperature of the soap was 26° C. at entry and 49° C. at exit.

The material extruded from the device had a transmission of 64%.

EXAMPLE VIII

A cavity transfer mixer of FIG. 8 having the external cylinder rotatable and the central shaft fixed was used to prepare a soap with increased transparency. The cavities were elongate with the larger dimension arranged circumferentially and positioned in the pattern of FIG. 7. The cavities had an arc dimension of 5.1 cm with hemispherical section ends of radius 1.2 cm, that is the cavities had a width of 2.4 cm.

The outer cylinder had four rows of slots and the central stationary shaft three rows of cavities with half cavities at each end.

The formulation of Example I was passed through the device by means of a soap plodder. The outer rotor was turned at 148 r.p.m. and a throughput of 240 g/minute was provided. The input and output temperatures were 30° C. and 46° C. with the application of cooling in both surfaces. The extruded product had a transmission of 61%.

What we claim is:

1. The process of increasing the transparency of soap-containing detergent material in which shear sensitive soap-containing material is subjected to working by passing the material between two closely spaced mutually displaceable surfaces each having a pattern of cavities which overlap during movement of the surfaces so that the material moved between the surfaces traces a path through cavities alternately in each surface, whereby the bulk of the material passes through the shear zone in the material generated by displacement of the surfaces.

2. A process according to claim 1 wherein the two surfaces have cylindrical geometry.

3. A process according to claim 1 or 2 wherein thermal control is applied to at least one surface.

4. A process according to claim 1 or 2 wherein the cavities in at least one surface are elongate with their long dimension normal to the flow of material.

5. A process according to claim 1 or 2 wherein the temperature of the soap-containing formulation during processing is in the range from about 30° C. to about 55° C.

* * * * *